United States Patent [19]
Peck, Jr.

[11] Patent Number: 5,883,993
[45] Date of Patent: Mar. 16, 1999

[54] FIBER OPTIC "T" COUPLER MODULATOR

[75] Inventor: James L. Peck, Jr., Huntington Beach, Calif.

[73] Assignee: Boeing North American, Inc.

[21] Appl. No.: 842,309

[22] Filed: Apr. 24, 1997

[51] Int. Cl.⁶ .................................................. G02B 6/26
[52] U.S. Cl. .................................................................. 385/44
[58] Field of Search .......................... 385/31–34, 44, 385/14, 140, 16, 23, 11, 1–9

[56] References Cited

U.S. PATENT DOCUMENTS

| | | | |
|---|---|---|---|
| 4,257,671 | 3/1981 | Bardaudy et al. | 385/33 |
| 4,991,924 | 2/1991 | Shankar et al. | 385/16 |
| 5,050,954 | 9/1991 | Gardner et al. | 385/16 |
| 5,612,824 | 3/1997 | Si et al. | 385/124 |
| 5,727,109 | 3/1998 | Pan et al. | 385/140 |
| 5,742,712 | 4/1998 | Pan et al. | 385/16 |

Primary Examiner—Akm E. Ullah
Attorney, Agent, or Firm—Harry B. Field; Steven E. Kahm

[57] ABSTRACT

This invention relates to modulating light transmitted in an optic fiber. A passive light modulating device such as a polarizing material, a filter, or an attenuator is placed between two facing collimated ends of GRIN lenses attached to two optic fibers. The passive light modulating device modulates the light in the desired manner as it is transmitted between the two optic fibers. An active light modulating device such as a switch or an amplifier may also be used between the two GRIN lenses to actively modify the transmitted light.

12 Claims, 1 Drawing Sheet

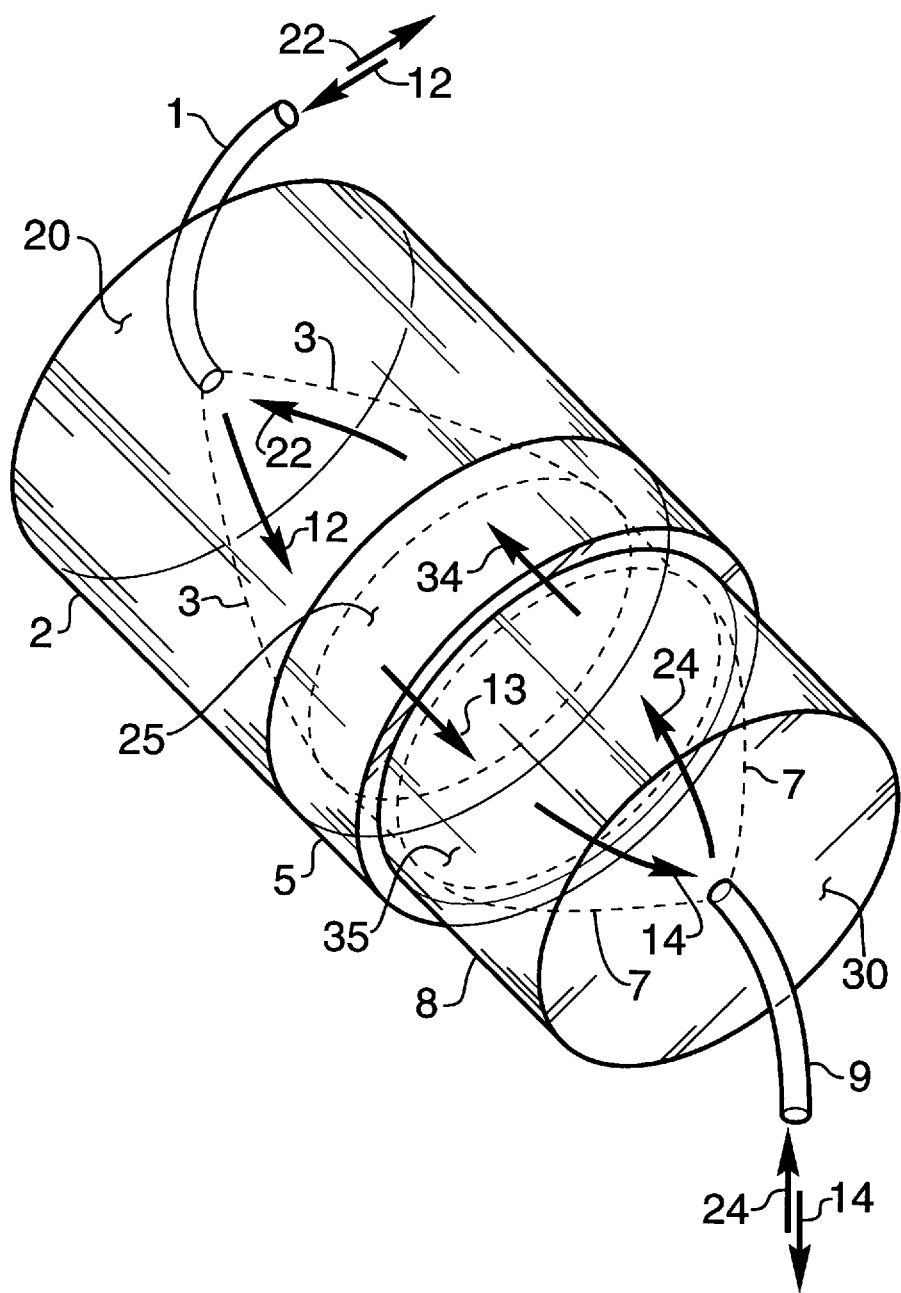

FIBER OPTIC "T" COUPLER MODULATOR

BACKGROUND OF THE INVENTION

1. Field of the Invention

This invention relates to modulators in optic fiber couplers and more particularly to filters, polarizers, on/off switches, amplifiers and other devices for modulating the light transmitted on an optic fiber.

2. Description of the Related art

In the past modulation and modification of light on optic fiber was accomplished at the light generating source by varying the input voltage on the energy generator or by using filtering and polarizing devices based on fusion technology in the optic fibers.

SUMMARY OF THE INVENTION

The invention uses two quarter wave length GRIN lenses with their collimated ends facing each other with a modulation device therebetween. The modulation device acts on the collimated light transmitted between the GRIN lenses. The modulator can be a filter, a polarizer, an optical switch, an amplifier or any other device for modulating light.

OBJECTS OF THE INVENTION

It is an object of the invention to modulate the light signals in an optical fiber.

It is also an object of the invention to attenuate optical energy as it is transmitted in an optical fiber.

It is also an object of the invention to filter optical energy as it is transmitted in an optical fiber.

It is also an object of the invention to actively modify optical energy as it is transmitted in an optical fiber.

It is also an object of the invention to polarize optical energy as it is transmitted in an optical fiber.

It is also an object of the invention to actively modulate optical energy as it is transmitted in an optical fiber.

Other objects, advantages and novel features of the present invention will become apparent from the following detailed description of the invention when considered in conjunction with the accompanying drawing.

BRIEF DESCRIPTION OF THE DRAWING

The DRAWING shows a modulator between two GRIN lenses.

DETAILED DESCRIPTION OF THE PREFERRED EMBODIMENT

The FIGURE shows light 12 transmitted in optic fiber 1 to the focusing end 20 of GRIN lens 2. The light 12 enters GRIN lens 2 as a point source and is collimated as shown by propagation envelope 3, which is generally conical in shape, as shown in the FIGURE. The collimated light 12 leaves GRIN lens 2 at collimating end 25 and is transmitted through a light modulating device 5. The light being modulated 13 emerges from the modulating device 5 and enters the collimating end 35 of GRIN lens 8 as modulated light 14. The propagation envelope 7, which is generally conical in shape, as shown in the FIGURE, of GRIN lens 8 focuses the modulated light 14, and it exits the focusing end 30 of GRIN lens 8 on optic fiber 9.

As shown in the FIGURE, the propagation envelopes 3 and 7, respectively, each have an apex which is generally disposed in a plane coincident with the focusing end of its respective GRIN lens, and a base which is generally disposed in a plane coincident with the collimating end of its respective GRIN lens.

GRIN lenses 2 and 8 are preferably a quarter wave length GRIN lenses to collimate the light from a point source and the reverse.

It should be understood that the device is bidirectionally reciprocal such that the reverse flow of light is also modulated by the modulating device 5 whereby light transmitted in both directions is possible. Thus light 24 entering GRIN lens 8 by way of optical fiber 9 is being modulated as light 34 in light modulating device 5 and enters GRIN lens 2 as modulated light 22 which is then transported on optic fiber 1.

The modulating device 5 may be a passive or an active device.

Examples of passive modulating devices 5 are polarizers to polarize the light passing though modulating device 5, frequency selectors such as high frequency bypass filters, low frequency bypass filters, and frequency notch pass filters, to block unwanted light frequencies from passing through the modulating device, and filters for decreasing the intensity of the light passing through the modulator 5. Active modulating devices include, but are not limited to, attenuators (on/off switches), amplitude modulation devices, and frequency modulation devices.

A transmissive measuring device may be substituted for the modulating device 5 such as a photon counter, without deviating from the teachings of the invention.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A light modulating filter optic coupler comprising:

a first substantially quarter wave length GRIN lens having a focusing end and a collimating end, the first GRIN lens having a generally conical first propagation envelope, the first propagation envelope having a base generally disposed in a plane coincident with said collimating end and having an apex generally disposed in a plane coincident with said focusing end;

a second substantially quarter wave length GRIN lens having a focusing end and a collimating end, the second GRIN lens having a generally conical second propagation envelope, the second propagation envelope having a base generally disposed in a plane coincident with said collimating end and having an apex generally disposed in a plane coincident with said focusing end;

a light modulating device attached to the collimating end of the first GRIN lens and to the collimating end of the second GRIN lens, between said first and second GRIN lenses, for modulating light passing through the coupler, and a first optical fiber disposed substantially at the apex of the first propagation envelope, at the focusing end of the first GRIN lens, and a second optical fiber disposed substantially at the apex of the second propagation envelope, at the focusing end of the second GRIN lens.

2. A light modulating fiber optic coupler as in claim 1 wherein:

the light modulating device is a polarizing material.

3. A light modulating fiber optic coupler as in claim 1 wherein:

the light modulating device is a filter.

4. A light modulating fiber optic coupler as in claim 1 wherein:

the light modulating device is an amplifier.

5. A light modulating fiber optic coupler as in claim 1 wherein:

the light modulating device is a switch.

6. A light modulating fiber optic coupler as in claim 1 wherein:

the light modulating device is an attenuator.

7. A light modulating fiber optic coupler as in claim 1 wherein:

the light modulating device is a frequency modulator.

8. A light modulating fiber optic coupler as in claim 1 wherein:

the light modulating device is an amplitude modulator.

9. A light modulating fiber optic coupler as in claim 1 wherein:

the light modulating device is a high frequency bypass filter.

10. A light modulating fiber optic coupler as in claim 1 wherein:

the light modulating device is a low frequency bypass filter.

11. A light modulating fiber optic coupler as in claim 1 wherein:

the light modulating device is a frequency notch pass filter.

12. A light modulating fiber optic coupler as in claim 1 wherein:

the light modulating device is a transmissive measuring device.

* * * * *